(12) United States Patent
Andersson

(10) Patent No.: US 8,978,696 B2
(45) Date of Patent: Mar. 17, 2015

(54) CHECK VALVE

(75) Inventor: Allan Bo Andersson, Cambridge, NY (US)

(73) Assignee: Flomatic Corporation, Glens Falls, NY (US)

( * ) Notice: Subject to any disclaimer, the term of this patent is extended or adjusted under 35 U.S.C. 154(b) by 34 days.

(21) Appl. No.: 13/608,516

(22) Filed: Sep. 10, 2012

(65) Prior Publication Data

US 2014/0069530 A1 Mar. 13, 2014

(51) Int. Cl.
*F16K 15/06* (2006.01)
*F16K 17/12* (2006.01)

(52) U.S. Cl.
CPC ................ *F16K 15/06* (2013.01); *F16K 17/12* (2013.01)
USPC ............................. 137/533; 137/543; 137/469

(58) Field of Classification Search
CPC .................................. F16K 15/06; F16K 1/465
USPC .................. 137/533, 533.21, 533.23, 533.29, 137/533.31, 532, 534, 543, 516.29, 528, 137/469; 251/363, 332, 333, 364
See application file for complete search history.

(56) References Cited

U.S. PATENT DOCUMENTS

| | | | | |
|---|---|---|---|---|
| 142,458 A * | 9/1873 | Gould | ....................... | 137/533.31 |
| 2,672,882 A | 3/1954 | Bergquist | | |
| 2,769,457 A * | 11/1956 | Wittenberg | .................... | 137/512 |
| 4,185,656 A | 1/1980 | Braukmann | | |
| 4,203,466 A * | 5/1980 | Hager | ............................ | 137/543 |
| 5,193,577 A * | 3/1993 | de Koning | ............... | 137/516.29 |
| 6,581,633 B2 | 6/2003 | Andersson | | |
| 2007/0107785 A9 | 5/2007 | Talaski | | |
| 2008/0210310 A1* | 9/2008 | Gilcher | ......................... | 137/215 |

FOREIGN PATENT DOCUMENTS

CA 994205 8/1976

OTHER PUBLICATIONS

Andersson, Check Valve, U.S. Appl. No. 13/272,792, filed Oct. 13, 2011.
Andersson, Check Valve, U.S. Appl. No. 13/272,783, filed Oct. 13, 2011.
Gulf Rubber Product Sheet, Check Valves, 4074-25 mm Check Valve OV25 LP, http://www.neoperl.net/content/oem/products/checkvalves/linesfeatures/nvovofodline.html, Jun. 18, 2009.
Gulf U.S., Inc., Gulf Engineered Rubber and Plastics, Check Valves, http://www.gulfrubber.com/checkvalvesdata.html, Aug. 10, 2012.

* cited by examiner

*Primary Examiner* — Kevin Lee
*Assistant Examiner* — P. Macade Nichols
(74) *Attorney, Agent, or Firm* — Heslin Rothenberg Farley & Mesiti P.C.

(57) ABSTRACT

A check valve is provided for use with variable frequency drives and other applications. In one aspect, the check valve provides a poppet guided by a poppet guide in at least two locations to ensure stability between fully open and fully closed positions. In another aspect, the check valve includes a poppet guide adapted to receive a poppet in a stem receiving channel, the stem receiving channel including guide vanes engaging the poppet and auxilliary channels for self cleaning.

19 Claims, 4 Drawing Sheets

CHECK VALVE

BACKGROUND

This invention relates generally to the field of valves, and more specifically to valves capable of tolerating a variable flow of fluid

BRIEF SUMMARY

Check valves are designed to permit the flow of fluid in one direction while preventing the fluid from flowing in the reverse direction. Conventional check valves utilize a single poppet valve within a valve housing that controls the flow of fluid therethrough. However, conventional poppet valves are likely to become lodged in the interior seat provided by an annular flange within the valve housing. When this happens, it is almost impossible to dislodge the poppet valve without dismantling the check valve or utilizing a new fitting. Moreover, conventional valves are difficult to assemble and may include many parts and fasteners. It may awkward to assemble and/or repair conventional valves because different parts can be located on opposite sides of a valve seat or flange formed within the valve housing.

SUMMARY OF THE INVENTION

The shortcomings of the prior art are overcome and additional advantages are provided through use of a check valve constructed in accordance with one or more principles of the present invention. The check valve constructed in accordance with one or more aspects of the present invention may be used in any type of hydraulic or other fluid flow lines such as, for example, water, fuel or gas lines, wells, cisterns, submersible pump applications, pumping outfits or the like. Additionally, other uses may be made of the invention that fall within the scope of the claimed invention but when are not specifically described below.

In one aspect of the invention, there is provided a check valve for use in a housing that includes an inner peripheral surface defining a passage therethrough between an inlet and an outlet. The check valve comprises a valve seat ring attachable to the housing. The valve seat ring defines a valve seat. The check valve further comprises a poppet guide. The poppet guide includes a base attachable to the valve seat ring, a stem guide, and at least three support legs extending between the base and the stem guide. Each support arm includes an inner peripheral surface. The stem guide includes an inner surface defining a stem receiving channel. At least three stem guide vanes extend radially inward from the inner surface of the stem guide into the stem receiving channel. The check valve further comprises a poppet. The poppet is moveable between a closed position against the valve seat to a fully open position. The poppet includes a stem connected to a head. The poppet stem is telescopically received by the at least three stem guide vanes in the stem receiving channel of the stem guide. The head includes an outer peripheral surface. At least a first portion of the outer peripheral surface of the head extending circumferentially around the head engages the inner peripheral surfaces of the at least three support legs of the poppet guide as the poppet moves between the closed position to the fully open position. A second portion of the outer peripheral surface of the head extending circumferentially around the head engages the valve seat in the closed position. The head is resiliently biased in the closed position against the valve seat.

In another aspect of the invention, the poppet head is resiliently biased in the closed position against the valve seat by a weight. The weight may be centrally located in or on the poppet head. Unlike a spring, a weight provides the same opening and closing force regardless of where the poppet head is in relation to the valve seat.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
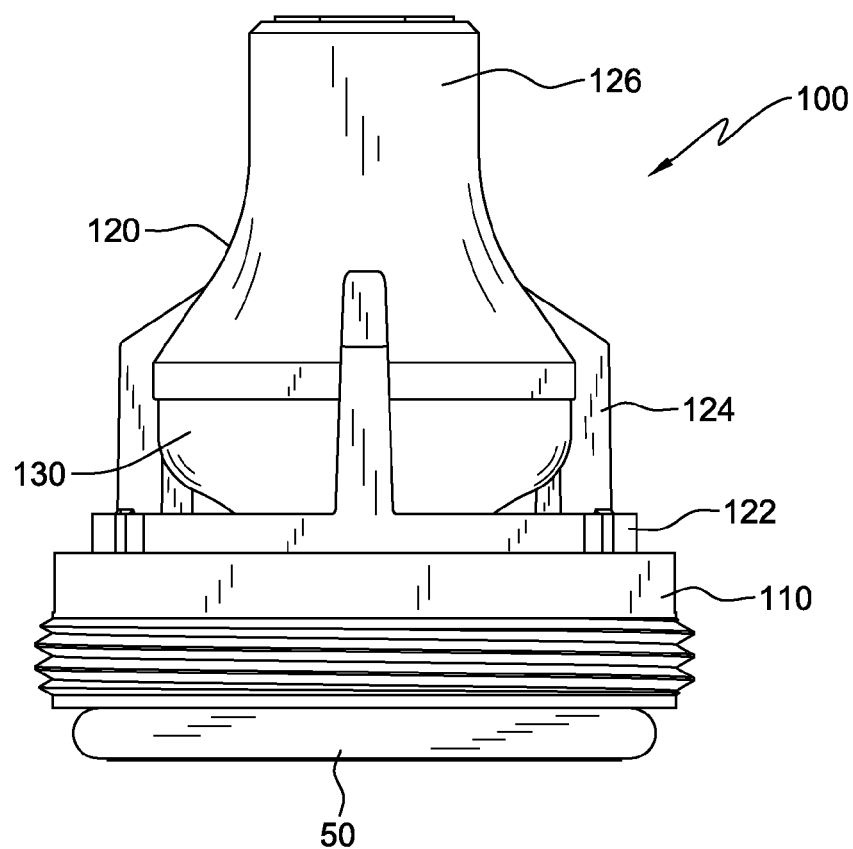
FIG. 1 depicts a side view of a check valve constructed in accordance with one or more aspects of the invention.

For the purposes of promoting an understanding of the principles of a valve designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the check valve invention relates.

Presented herein is an improved valve capable of handling variable fluid flow in either a vertical or horizontal direction. In traditional applications of fluid control valves, the rate of fluid flow was either very high or very low. Thus, a valve disk would always need to be positioned either in the maximum open position or the maximum closed position to operate properly. However, more recently, variable frequency drives have been used to power pumps, resulting in a variable rate of fluid flow. The variable rate of fluid flow may cause a valve to be disposed at a distance between the maximum open position and the closed position. However, traditional valves do not function properly when used in connection with these variable frequency drive pumps because the pressure exerted against the valve disk is insufficient to displace it to the maximum open position.

Conventional check valves are used in a valve housing. Valve housings include, for example, an inner peripheral surface defining a passage therethough between an inlet port and an outlet port. The valve housing includes a flange dividing the passage between the inlet and outlet ports into an upstream portion and a downstream portion. The flange extends circumferentially around the inner peripheral surface of the housing an defines a valve seat and has an inner surface defining a valve aperture. Conventional check valves include a valve disk in the downstream portion of the valve housing connected to a stem having legs extending through the valve aperture and into the upstream portion of the valve housing. These check valves also include a rubber disk that cooperates with the valve seat forming the valve aperture. The rubber disk seals with the valve seat to prevent leakage of fluid when the valve is in the closed position. This rubber seal is positioned between a valve disk and a valve stem and held tightly by a fastener connecting the valve disk to the valve stem. An example of a valve having this configuration is described in more detail in U.S. Pat. No. 6,581,633 to Andersson, which is hereby incorporated herein by reference. However, assembly and/or repair of these valves are difficult because the valve disk and the valve stem are located on opposite sides of the valve seat or flange formed within the valves. Also, over time, the poppet legs extending through the valve aperture wear causing, for example, the poppet to stick in the valve aperture or degrade the seal surface.

A check valve constructed in accordance with one or more aspects of the invention significantly increases the stability of a check valve by, for example, guiding a poppet of a check valve in at least two locations to provide more stable axial movement as the poppet moves between fully open and fully closed positions. A check valve constructed in accordance with one or more aspects of the invention also provides increased stability by using, for example, a weight rather than a spring to bias the check valve in a closed position. A weight provides, for example, the same closing force regardless of where the poppet is position between a fully closed position and a fully open position. A check valve constructed in accordance with one or more aspects of the invention also avoid passing any part through the valve aperture that could wear or degrade the seal surface.

By way of example, FIG. 1 depicts a check valve 100. Check valve 100 depicted in FIG. 1 includes a valve ring 110 removeably mounted by, for example, a threaded arrangement, to the inside of a valve housing or to a conventional valve seat, a poppet guide 120 attachable to valve ring 110 and a poppet 130.

Figure 2:
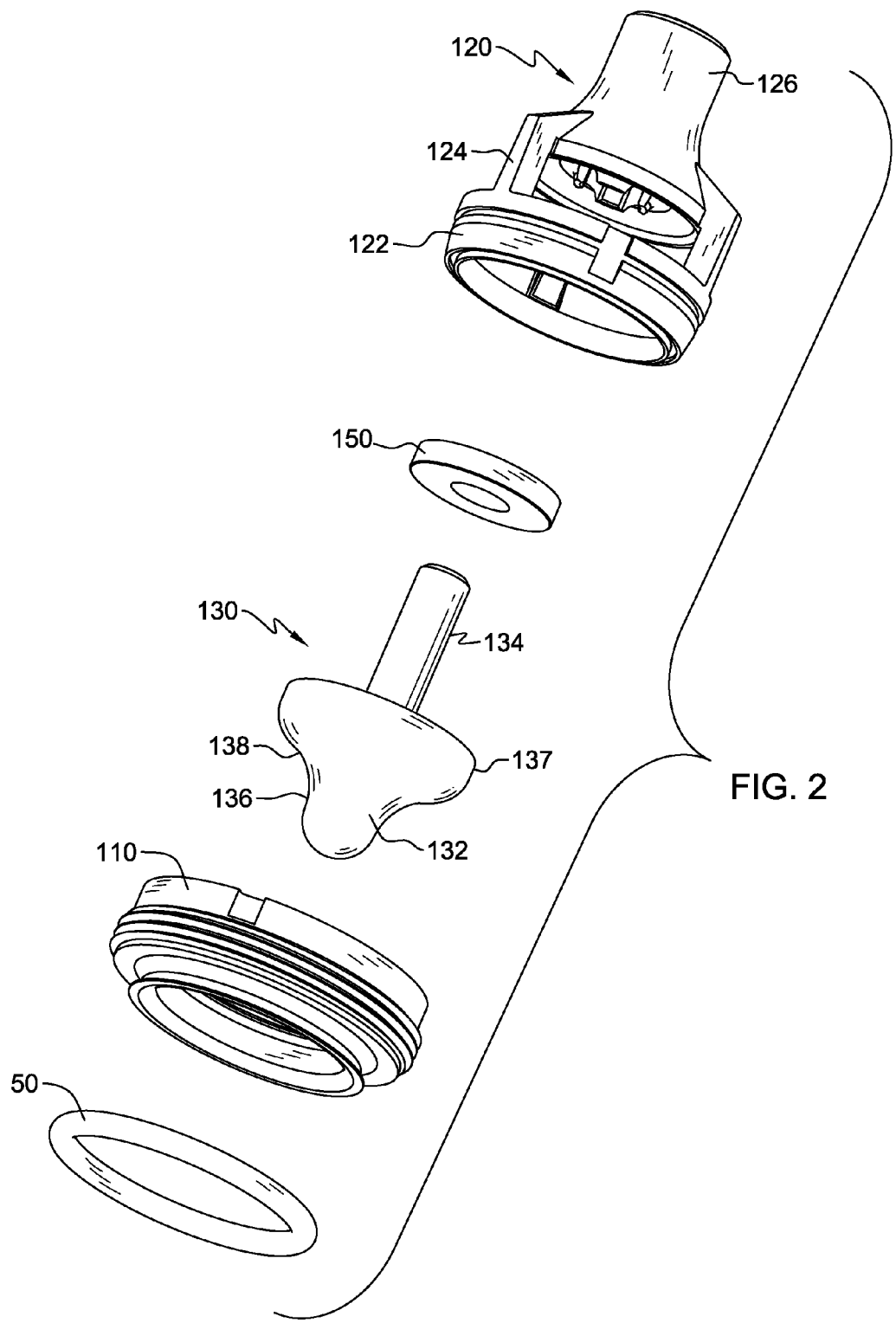
FIG. 2 depicts an exploded view of the check valve shown in FIG. 1 and constructed in accordance with one or more aspects of the invention.
Figure 5:
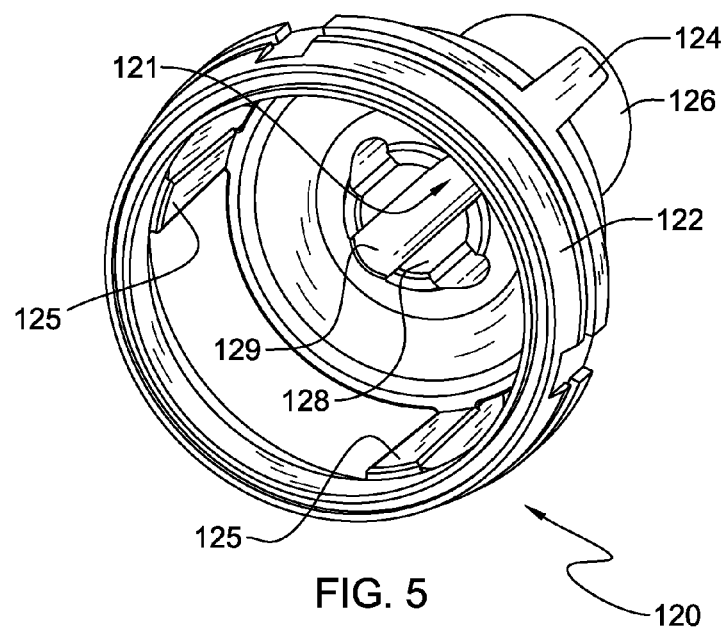
FIG. 5 depicts a bottom perspective view of a stem guide of a check valve constructed in accordance with one or more aspects of the invention.
Figure 6:
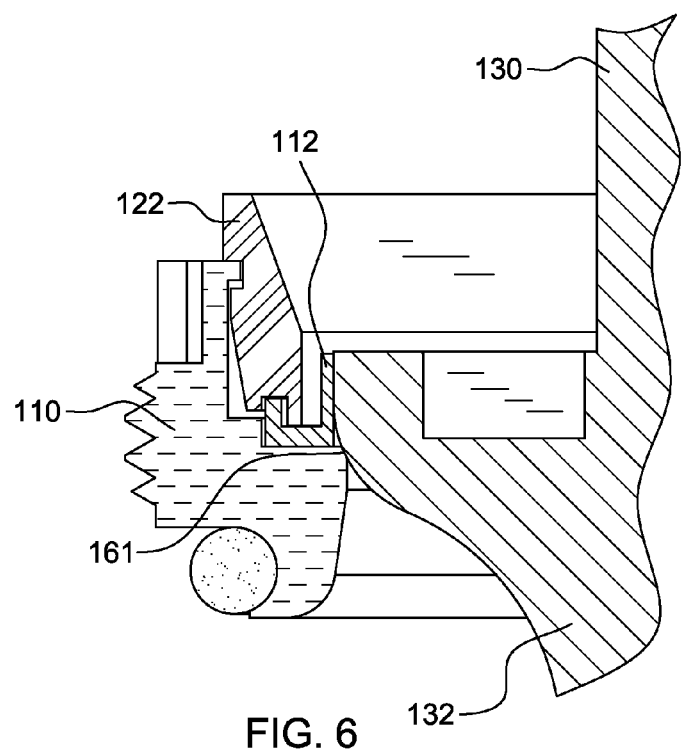
FIG. 6 depicts a partial cross sectional view illustrating one embodiment of an attachment between a valve ring and a poppet guide in accordance with one or more aspects of the invention.

As illustrated in FIGS. 1, 2 and 5, an example of poppet guide 120 includes a base 122, a stem guide 126, and support legs 124 extending between base 122 and stem guide 126. In one embodiment, as illustrated in FIG. 6, base 122 of valve ring 110 may be secured to poppet guide 120 by, for example a snap fit assembly. Valve ring 110 may also include a valve seal 112. In one embodiment, valve seal 112 is u-shaped and secured in place by the connection between valve ring 110 and poppet guide 120. Valve seal 112 may be, for example, "u" or cup-shaped having an outer surface that engages a portion of an outer surface of poppet 130, as illustrated in the example depicted in FIG. 6, creating a seal that conforms to poppet head 132 when poppet 130 is in the closed position. This seal is mechanically supported between a circular surface area 161 on valve ring 110 and the curved surface area of poppet 130. Each support leg 124 of poppet guide 120 includes an inner peripheral surface 125, as illustrated in FIG. 5. Inner peripheral surfaces 125 are curved such that inner peripheral surfaces 125 of all the support legs are at the same radial distance from the longitudinal center of poppet guide 120. Poppet guide 120, as illustrated, shown in FIGS. 2 and 5, may include four support legs 124 that extend from base 122 to stem guide 126, but as few as three or more than four can be used.

Stem guide 126 includes an inner surface defining a stem receiving channel 121. Inner surface of stem receiving channel 121 may include three or more guide vanes 128 projecting radially inward into stem receiving channel 121 Inner surface of stem guide 126 may also include auxiliary channels 129 formed between adjacent guide vanes 128. Auxiliary channels 129 are formed to, for example, clear debris for self-cleaning of the check valve. All of guide vanes 128 include an outer surface at the same radial distance from the center of stem receiving channel 121.

Figure 3:
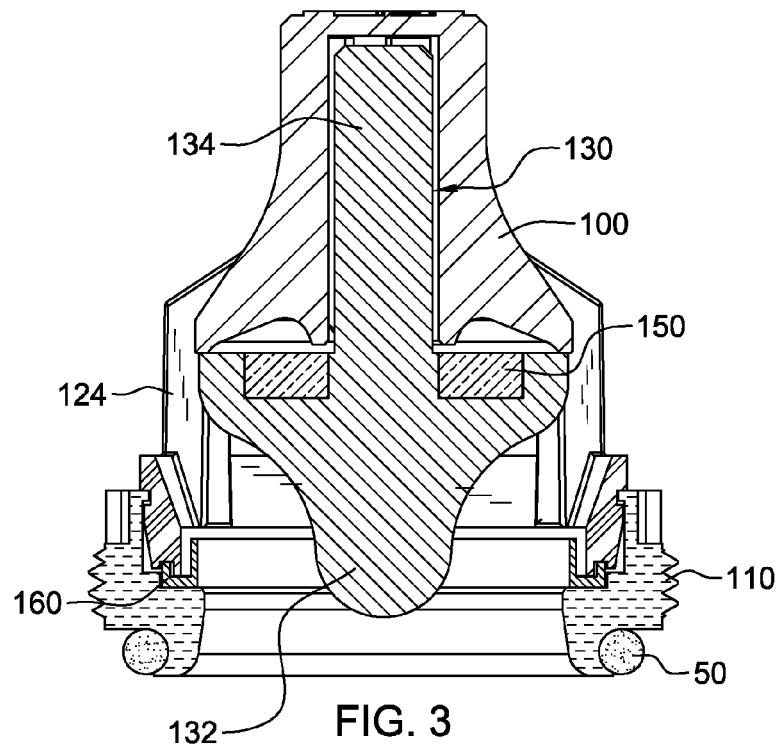
FIG. 3 depicts a longitudinal cross sectional view through a check valve constructed in accordance with one or more aspects of the invention, where the check valve is in a fully open position.

In the illustrative example shown in FIGS. 1 and 2, poppet 130 includes a head 132 connected to a stem 134. Head 132 includes an outer peripheral surface 136 having an upper portion 137 and a lower portion 138. In one example, upper portion 137 comprises a diameter greater than lower portion 138 and greater than the diameter of the aperture formed in valve seat ring 110. In one embodiment, head 132 may be, for example, contoured to maximize laminar flow and minimize flow losses. In a fully open position, head 132 is stopped and supported by the bottom of stem guide 126 of poppet guide 120, as illustrated in FIG. 3. In a fully closed position, a portion of outer surface 136 of head 132 engages an outer surface of seal 112 of valve ring 110. In one embodiment, another portion of outer surface 136 of head 132 may be mechanically supported by a valve seat 161 defined by valve ring 110, as illustrated in FIG. 6.

Stem 134 may be cylindrical and telescopically received by stem receiving channel 121 of stem guide 126. Guide vanes 128 in stem receiving channel 121 aids in guiding the reciprocating movement of stem 134 of poppet 130 during opening and closing of the valve. According to one aspect of the present invention, poppet 130 is guided by both the engagement of stem 134 with guide vanes 128 and upper portion 137 of head 132 with inner peripheral surfaces 125 of support legs 124 to provide better guiding and more stable axial movement of the poppet between a fully open position to a fully closed position. As poppet 130 moves between a fully opened and closed positions, stem 134 cooperates with guide vanes 128 and upper portion 137 of head 132 cooperate with inner peripheral surfaces 125 of support legs 124 to maintain poppet 130 substantially in alignment with the valve seat.

Figure 4:
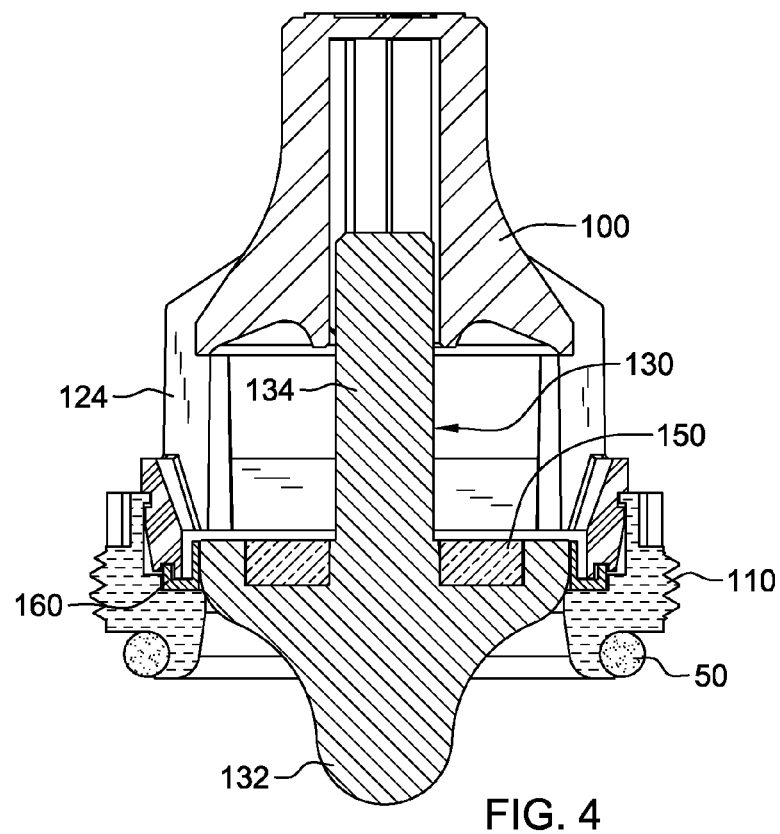
FIG. 4 depicts a longitudinal cross sectional view through a check valve constructed in accordance with one or more aspects of the invention, where the check valve is in a closed position.

The stability of poppet 130 may be increased by, for example, increasing the total length and/or diameter of stem 134 about which stem guide 126 is disposed. In one embodiment, the maximum stability of the poppet is achieved where the diameter of stem 134 is about twenty five percent of the distance that poppet 136 travels from a fully open position to a fully closed position, as illustrated in FIGS. 3 and 4. The cross-section of the check valve when fully open promotes laminar flow and minimized hydraulic vortex forces on the backside of the valve poppet because the outside diameters of poppet guide 120 and poppet 130 are uniform. Similarly, embodiments where guide 120 is disposed about a greater portion of stem 134 are more stable than embodiments where guide 120 is disposed about a lesser portion of stem 134. In accordance with various aspects of the invention, the diameter of stem 134 and the stem guide 120 is disposed about may vary in order to achieve the amount of desired stability of poppet 130 such that other characteristics of check valve 100 are not compromised.

Check valve 100 may include a spring extending between the bottom of stem guide 120 and poppet head 130 telescopically coiled over the outer diameter of poppet stem 134 to bias poppet 130 into a closed position. A first end of the spring may be supported or, alternatively, anchored against the bottom of stem guide 120. Opposite end of the spring may be supported or, alternatively, anchored against the top surface of poppet head 132. As the force exerted by fluid pressure on head 132 overcomes the force exerted by the spring, head 132 is displaced upwardly and disengages from valve seat allowing fluid to flow through the valve. A spring may be used in a valve capable of handling variable fluid flow in either a vertical or horizontal direction. A spring, however, applies different forces to poppet head 132 depending on the amount the spring is compressed or recoiled.

In an alternative embodiment, referring, for example, to FIG. 2, poppet 130 may include a weight 150. Weight 150 may be used to bias poppet 130 into a closed position in a valve capable of handling variable fluid flow in a vertical direction. Weight 150 may be centrally located in or on poppet head 136 for quicker closing and poppet balance. Weight 150 may be made from, for example, stainless steel. Unlike a spring, weight 150 provides the same opening and closing force regardless of where head 132 is in relation to the valve seat and does not store energy, like a recoiled spring. Use of a weight also prevents jamming of debris in the flow way.

Current check valve designs are compromised due to a lack of stability when they are not in a fully open or fully closed position. This lack of stability in partially open positions compromises the utility of these valves in connection with pumps that employ variable frequency drives. Pumps with variable frequency drives are capable of generating varying rates of fluid flow. At times, the variable fluid flow may be capable of overcoming the force of a spring required to keep the poppet in contact with the valve seat, but insufficient to displace the poppet to a fully open position. In conventional check valves, when a valve head is displaced from the valve seat, but not in a fully open position, the flow of fluid may cause the valve head to become misaligned. Also, conventional check valves that employ valve stems that extend through the valve aperture may also become misaligned or stuck, making the valve useless.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A check valve for use in a housing, wherein the housing includes an inner peripheral surface defining a flow path there through between an inlet and an outlet, said check valve comprising:
   a valve seat ring attachable to the housing in the flow path, said valve seat ring defining a valve seat;
   a poppet guide, said poppet guide including a base attachable to the valve seat ring, a stem guide, and at least three support legs extending between the base and the stem guide, each support leg including an inner peripheral surface, the stem guide including an inner surface defining a stem receiving channel, wherein at least three stem guide vanes extend radially inward from the inner surface of the stem guide into the stem receiving channel; and
   a poppet, said poppet being moveable between a closed position against the valve seat to a fully open position, said poppet including a stem connected to a head, the stem being telescopically received by the at least three stem guide vanes in the stem receiving channel of the stem guide, the head including an outer peripheral surface,
   wherein at least a first portion of the outer peripheral surface of the head extending circumferentially around the head engages the inner peripheral surfaces of the at least three support legs of said poppet guide in at least one position of the poppet between the closed position and the fully open position,
   wherein a second portion of the outer peripheral surface of the head extending circumferentially around the head engages the valve seat in the closed position of the poppet, the head being resiliently biased in the closed position against the valve seat to mechanically support the head of the poppet, and the first and second portions of the outer peripheral surface of the head of the poppet being differing portions,
   wherein a seal is positioned on the valve seat ring, the seal engaging a third portion of the outer peripheral surface of the head of the poppet when the head is in the closed position that differs from the second portion of the head that engages the valve seat when the head is in the closed position, and
   wherein the head of the poppet is disengaged from the poppet guide when the poppet is in the closed position.

2. The check valve of claim 1, wherein at least one auxiliary channel is defined in the inner surface of the stem receiving channel of the stem guide between adjacent stem guide vanes.

3. The check valve of claim 1, wherein said poppet further comprising at least one of a spring and/or a weight for biasing the head in a downward direction away from the stem guide.

4. The check valve of claim 1, wherein the third portion of the outer peripheral surface of the head is at least a portion of the first portion of the outer peripheral surface of the head, and wherein the second portion of the outer peripheral surface of the head that engages the valve seat in the closed position is positioned on an inlet-side of the third portion of the outer peripheral surface of the head that engages the seal in the closed position.

5. A check valve for use in a housing, wherein the housing includes an inner peripheral surface defining a flow path there through between an inlet and an outlet, said check valve comprising:

a valve seat ring attachable to the housing between the inlet and outlet in the flow path, said valve seat ring defining a valve seat and including a seal positioned on the valve seat ring;

a poppet guide, said poppet guide including a base attachable to the valve seat ring, a stem guide, and at least three support legs extending between the base and the stem guide, each support leg including an inner peripheral surface, the stem guide including an inner surface defining a stem receiving channel, wherein at least three stem guide vanes extend radially inward from the inner surface of the stem guide into the stem receiving channel and at least one channel is defined between adjacent stem guide vanes; and a poppet, said poppet being moveable between a fully closed position against the valve seat to a fully open position, said poppet including a stem connected to a head, the stem being telescopically received by the stem guide, the head including an outer peripheral surface, wherein at least a first portion of the outer peripheral surface of the head extending circumferentially around the head engages the inner peripheral surfaces of the at least three support legs of said poppet guide during movement of the poppet between the fully closed position to the fully open position, and wherein an upper portion of the head extending circumferentially around the head is positioned against the poppet guide in the fully open position, wherein the head is resiliently biased in the fully closed position, wherein the poppet is stopped and supported by the bottom of the stem guide in the fully open position to block the at least one channel in the stem guide from the flow path and direct the flow path over the poppet, through the at least three support legs extending between the base and the stem guide, and over an exterior surface of the stem guide, and wherein in the fully closed position of the poppet:
the first portion of the outer peripheral surface of the head is disengaged from the poppet guide;
a second portion of the outer peripheral surface of the head is engaged with the seal positioned on the valve seat ring; and
a third portion of the outer peripheral surface of the head that differs from the second portion thereof engages the valve seat.

6. The check valve of claim 5, wherein said stem guide of the poppet guide includes a first outside diameter and said poppet includes a second outside diameter at the portions thereof that abut in the fully open position of the poppet, and wherein the first and second outside diameters are substantially uniform to promote a laminar flow and minimized hydraulic vortex forces in the flow path.

7. The check valve of claim 1, wherein a portion of the seal is positioned between the valve seat ring and the poppet guide.

8. The check valve of claim 7, wherein a portion of the seal is positioned within a cavity formed between the valve seat ring and the poppet guide when they are attached to one another.

9. The check valve of claim 7, wherein the seal seals the junction between the valve seat ring and the poppet guide.

10. The check valve of claim 1, wherein the seal is mechanically supported between a circular surface area of the valve seat ring and the outer peripheral surface of the head of the poppet in the fully closed position of the poppet.

11. The check valve of claim 1, wherein the seal is mechanically supported by a surface of the valve seat ring positioned on an inlet-side of the seal.

12. The check valve of claim 11, wherein the surface of the valve seat ring mechanically supporting the seal extends further towards an interior of the housing than the seal in the closed position of the poppet.

13. The check valve of claim 1, wherein an upper portion of the head extending circumferentially around the head is positioned against the poppet guide in the fully open position, and wherein the poppet is stopped and supported by the bottom of the stem guide in the fully open position to block the at least one channel in the stem guide from the flow path and direct the flow path over the poppet, through the at least three support legs extending between the base and the stem guide, and over an exterior surface of the stem guide.

14. The check valve of claim 13, wherein said stem guide of the poppet guide includes a first outside diameter and said poppet includes a second outside diameter at the portions thereof that abut in the fully open position of the poppet, and wherein the first and second outside diameters are substantially uniform to promote a laminar flow and minimized hydraulic vortex forces in the flow path.

15. The check valve of claim 5, wherein a portion of the seal is positioned within a cavity formed between the valve seat ring and the poppet guide when they are attached to one another.

16. The check valve of claim 15, wherein the seal seals the junction between the valve seat ring and the poppet guide.

17. The check valve of claim 5, wherein the seal is positioned on and mechanically supported by a surface of the valve seat ring positioned on an inlet-side of the seal that extends further towards an interior of the housing than the seal in the closed position of the poppet.

18. The check valve of claim 1, wherein the valve seat is positioned further towards an interior of the housing than the seal in the closed position of the poppet.

19. The check valve of claim 5, wherein the valve seat is positioned further towards an interior of the housing than the seal in the closed position of the poppet.

\* \* \* \* \*